(12) United States Patent
Pratt et al.

(10) Patent No.: US 11,936,464 B2
(45) Date of Patent: Mar. 19, 2024

(54) SYSTEM AND METHOD FOR AUTOMATED DETERMINATION OF SATELLITE TRANSCEIVER TYPE

(71) Applicant: ARRIS ENTERPRISES LLC, Suwanee, GA (US)

(72) Inventors: Paul Richard Pratt, West Yorkshire (GB); Robert Michael Payne, Keighley (GB)

(73) Assignee: ARRIS Enterprises LLC, Horsham, PA (US)

( * ) Notice: Subject to any disclaimer, the term of this patent is extended or adjusted under 35 U.S.C. 154(b) by 394 days.

(21) Appl. No.: 17/296,051

(22) PCT Filed: Jun. 3, 2020

(86) PCT No.: PCT/US2020/035965
§ 371 (c)(1),
(2) Date: May 21, 2021

(87) PCT Pub. No.: WO2021/247019
PCT Pub. Date: Dec. 9, 2021

(65) Prior Publication Data
US 2023/0131419 A1    Apr. 27, 2023

(51) Int. Cl.
H04H 40/90    (2008.01)
H04B 7/185    (2006.01)
H04H 20/12    (2008.01)

(52) U.S. Cl.
CPC ..... H04B 7/18517 (2013.01); H04B 7/18513 (2013.01); H04H 20/12 (2013.01); H04H 40/90 (2013.01)

(58) Field of Classification Search
CPC ............ H04B 7/18517; H04B 7/18513; H04H 20/12; H04H 40/90
See application file for complete search history.

(56) References Cited

U.S. PATENT DOCUMENTS

| 6,205,185 B1 | 3/2001 | Kajiwara |
| 6,693,587 B1 | 2/2004 | Kuether et al. |
| 6,937,188 B1 * | 8/2005 | Saunders ............. H01Q 1/1257 342/359 |

(Continued)

FOREIGN PATENT DOCUMENTS

CN      103079100 B     3/2016

OTHER PUBLICATIONS

PCT Search Report and Written Opinion in International Application No. PCT/US2020/035965, dated Aug. 25, 2020, 6 pages.

(Continued)

Primary Examiner — Dai Phuong
(74) Attorney, Agent, or Firm — Panitch Schwarze Belisario & Nadel LLC

(57) ABSTRACT

A system and method enabling the automated installation and configuration of satellite system premises device. The system and method provide for tuning, locking and recognizing particular types of satellite system signals, and then responsively configuring and installing a premises device. The disclosed technology is capable of adapting to both one and two cable satellite premises systems, and is compatible with wideband low-noise block signals, as well as universal low-noise block and single-cable second-generation satellite signals.

24 Claims, 7 Drawing Sheets

(56) References Cited

U.S. PATENT DOCUMENTS

| | | |
|---|---|---|
| 11,637,580 B2* | 4/2023 | Ross ................... H04B 1/40 455/572 |
| 11,804,910 B1* | 10/2023 | Williams ............ H04L 12/2801 |
| 2006/0025092 A1 | 2/2006 | Sanders et al. |
| 2006/0050796 A1 | 3/2006 | Chambelin et al. |
| 2007/0136764 A1* | 6/2007 | Bajgrowicz ........ H04N 21/6143 725/100 |
| 2012/0040663 A1 | 2/2012 | Kamdar et al. |
| 2013/0271319 A1* | 10/2013 | Trerise ................ H01Q 1/125 342/359 |
| 2016/0127033 A1* | 5/2016 | Petrovic ............. H04B 1/0007 455/12.1 |
| 2016/0198152 A1* | 7/2016 | Chin ................. H04N 21/6143 725/107 |

OTHER PUBLICATIONS

Extended European Search Report, dated Jan. 23, 2024, issued in corresponding European Application No. 20891429.1-1207, 7 pages.

\* cited by examiner

SYSTEM AND METHOD FOR AUTOMATED DETERMINATION OF SATELLITE TRANSCEIVER TYPE

CROSS-REFERENCE TO RELATED APPLICATIONS

The present application is a national phase entry under 35 U.S.C. § 371 of International Application No. PCT/US2020/035965 filed Jun. 3, 2020, the disclosure of which is hereby incorporated herein by reference.

BACKGROUND OF THE INVENTION

Satellite provision of broadband media remains a popular option for consumers, especially those who find themselves in markets that are underserved by terrestrial broadband providers. A typical consumer system would consist of an external dish antenna, a signal upconverter/downconverter (usually co-located with the dish), and a premises device (a "set-top box") incorporating a tuner, a user interface and a video output.

Broadband service providers, including satellite service providers, increasingly rely upon the consumer for installation of the set-top box. This reliance offers the consumer the flexibility of upgrading or replacing a set-top box without scheduling a service call, and reduces the burden placed upon service provider technicians. Although such do-it-yourself installation of set-top boxes offers advantages to both the consumer and the service provider, satellite system set-top boxes can pose a particular technical challenge for untrained consumers.

Presently, satellite broadband systems connect to a set-top box via one of three different and incompatible interfaces: i) a universal low-noise block ("ULNB") interface utilizing either one or two connections to the set-top box; ii) a single-cable second-generation interface utilizing a single connection to the set-top box; or iii) a wideband low-noise block ("WLNB") interface utilizing two connections to a set-top box. To an untrained consumer presented with one or more unlabeled cables and a set-top box having any number of input and/or output jacks, the installation of a satellite set-top box could prove a confusing task. Such confusion is likely to result in an improper or ineffective installation, causing loss of service, consumer dissatisfaction, and the possible need for the service provider to dispatch a technician to correct the problem. All undesirable outcomes for both the consumer and the provider.

There exists a need for a system and method providing an improved, automated process for the installation of satellite system consumer premises devices, such as set-top boxes.

BRIEF SUMMARY OF THE INVENTION

A system and method enabling the automated installation and configuration of satellite system premises device. The system and method provide for tuning, locking and recognizing particular types of satellite system signals, and then responsively configuring and installing a premises device. The disclosed technology is capable of adapting to both one and two cable satellite premises systems, and is compatible with WLNB signals, as well as ULNB and single-cable second-generation satellite signals.

BRIEF DESCRIPTION OF THE DRAWINGS

The aspects, and advantages of the present invention will become better understood with regard to the following description, appended claims, and accompanying drawings in which:

DETAILED DESCRIPTION

Figure 1:
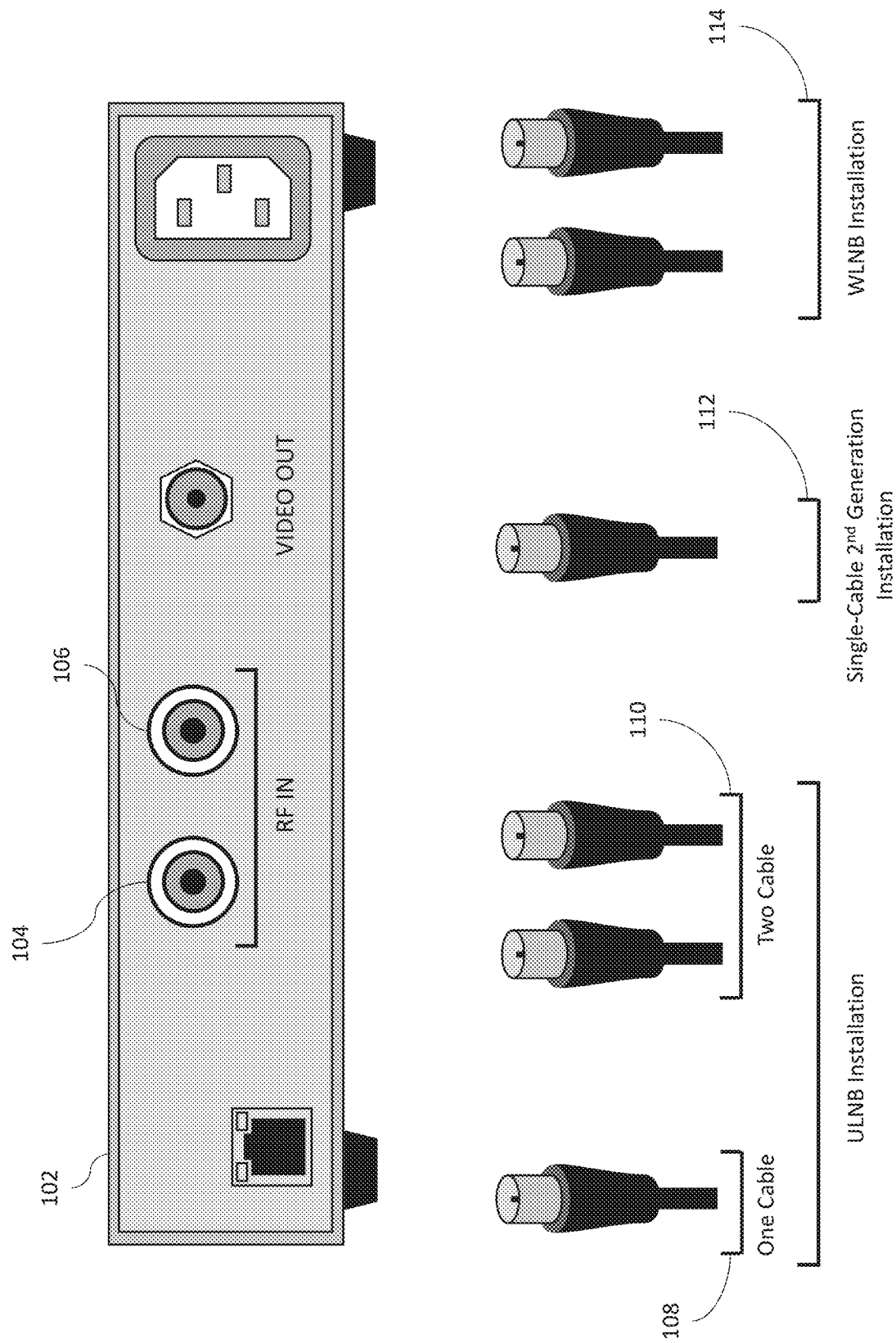
FIG. 1 is a diagram of a representation of the rear panel of a satellite set-top and RF cables adapted to connect thereto.

Typically, the set-top boxes utilized by satellite service providers for supporting residential broadband services are adapted to be compatible with multiple installation configurations. The operation of such set-top boxes is typically governed by an internal controller comprised of at least one processor and associated memory. FIG. 1 provides a simplified representation of the rear panel of a satellite set-top box 102, including female radio-frequency ("RF") input connectors 104 and 106. These connectors are typically adapted to accept L-band RF signals. In a given residential installation, a consumer would be required to connect one or more RF cables to these input connectors. Presently, satellite broadband systems connect to a set-top box via one of three different interfaces: i) a ULNB interface; ii) a single-cable second-generation interface; or iii) a ULNB interface. As shown in FIG. 1, a ULNB installation may require the connection of one cable (108) or two cables (110), a single-cable second-generation installation requires only a single cable to be connected (112), and a ULNB installation will require the connection of two cables (114) to the set-top box. Following the successful connection of the proper cable(s) to the proper input connector(s), a correctly adapted set-top box will provide the consumer with access to the appropriate broadband services.

However, to an untrained consumer, two ULNB cables (110) would likely appear identical to two ULNB cables (114). Likewise, a single ULNB cable (110) would be indiscernible from a single-cable second-generation cable (112). So as to enable the proper set-up of the set-top box and the correct provisioning of user bandwidth and services, the set-top box controller executes an automatic installation detection process.

Figure 2:
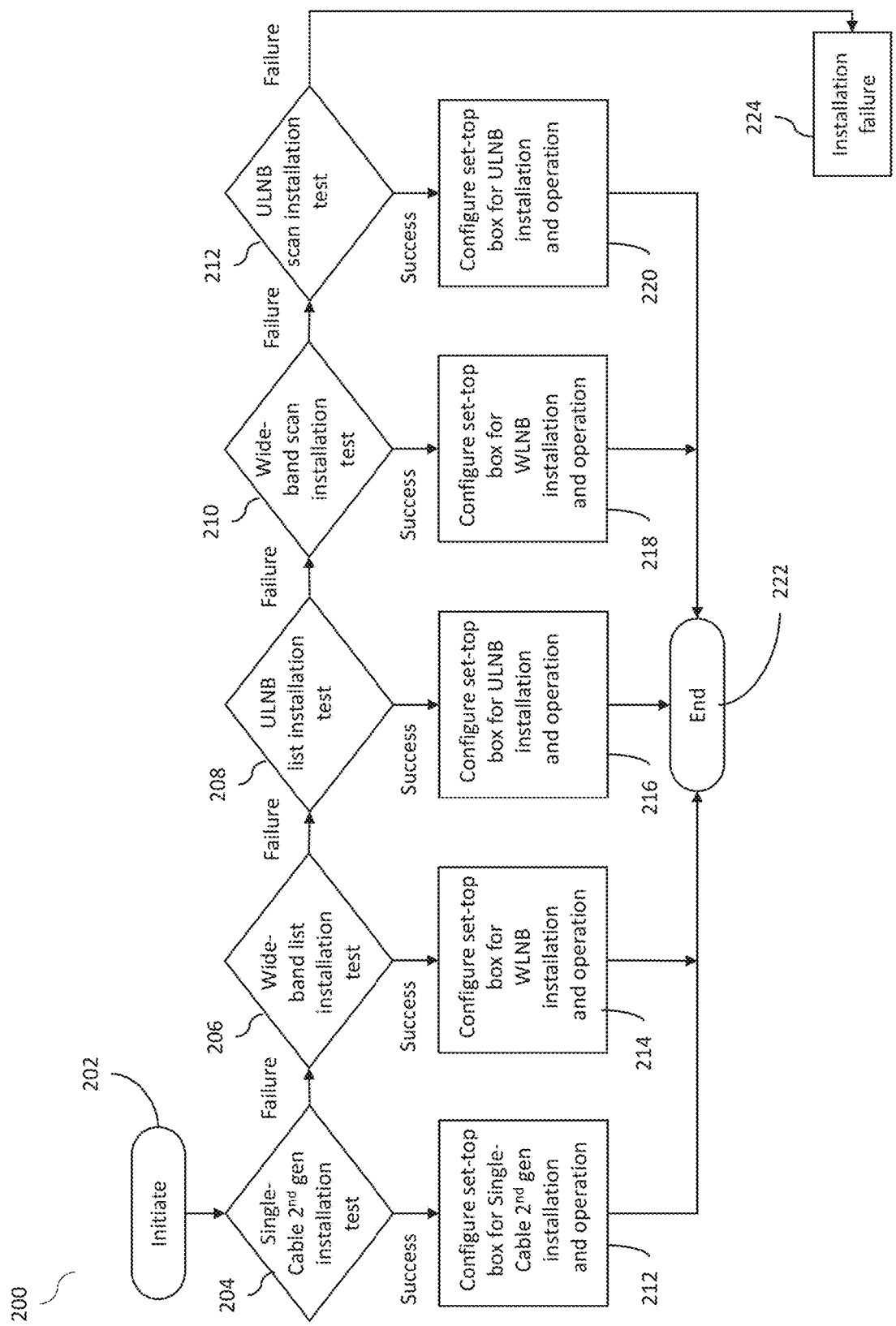
FIG. 2 is a high-level flow diagram of a process for automating the installation and configuration of a satellite premises device.

Once the consumer has connected the available cable(s) to RF connectors, the set-top box is initialized and a pre-programmed sequence of steps (200), as shown in the high-level process flow diagram of FIG. 2. The installation detection process executes a series of installation determination tests (204-212), each of which tests for certain conditions indicative of a particular predetermined installation configuration. If the testing yields a positive result, the set-top box is configured accordingly (steps 214-220) and the process terminates (step 222). If the particular installation determination test fails, the process continues by testing for a different installation configuration. If, after testing for all of the predetermined installation configurations, the process has failed to detect a viable one, a message indicative of installation failure is generated (224). Note that the particular order in which these tests are performed is immaterial to the viability of the overall process. In addition, each of the test and configure pairings depicted in FIG. 2 (204 and 212, 206 and 214, 208 and 216, etc.) is merely representative of a more detailed process performed to permit the system to determine the proper installation configuration. Examples of such processes are provided in FIGS. 3-7, and will be discussed below.

Figure 3:
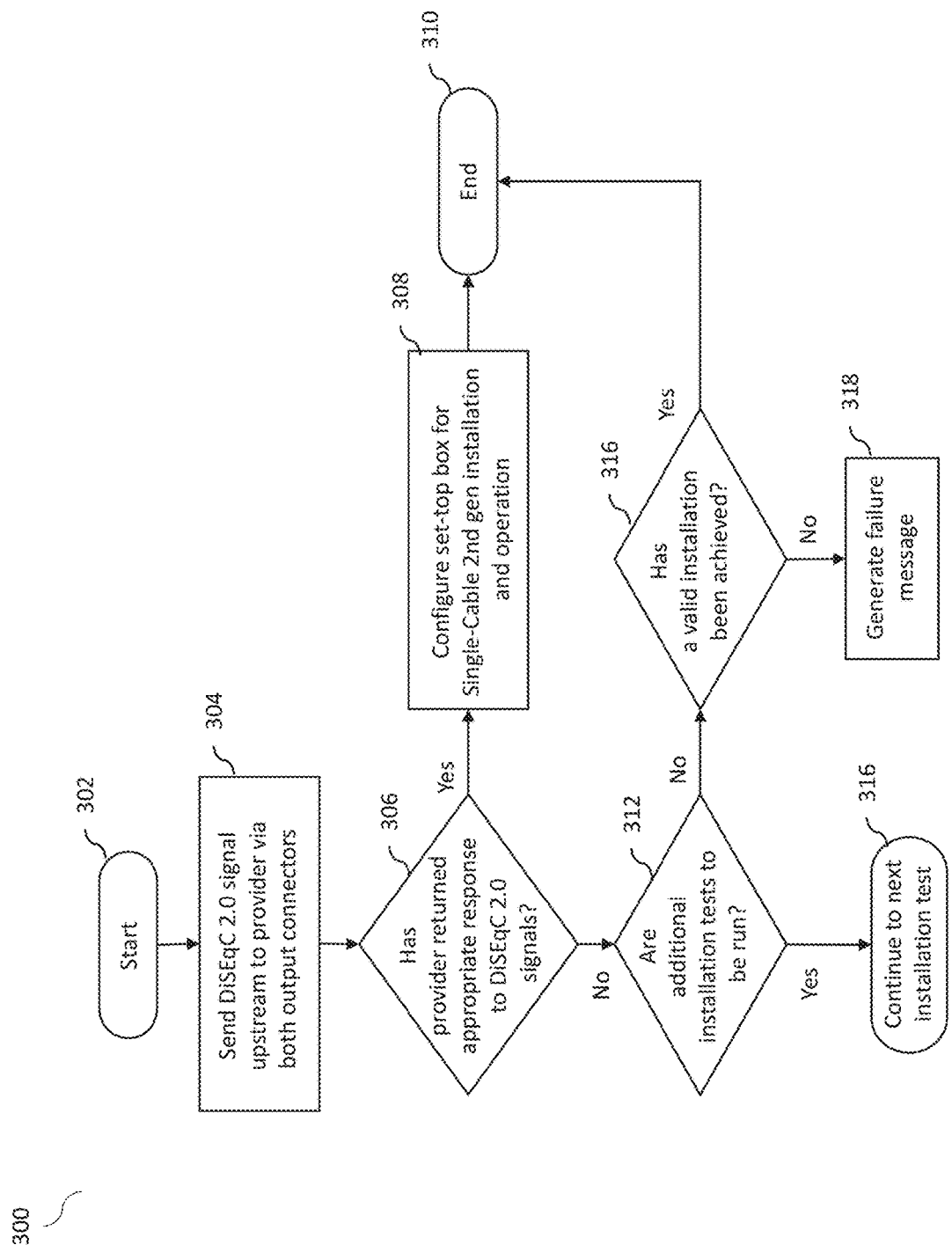
FIG. 3 is a functional block diagram of a process for automating the installation and configuration of a satellite premises device in response to detecting a single-cable second-generation radio-frequency signal.

FIG. 3 provides a process flow diagram of steps performed to detect a single-cable second-generation single cable installation and configure a set-top box accordingly. As shown, the process initiates at step 302 and the set-top box controller then directs the set-top box to send a message in accordance with the Digital Satellite Equipment Control ("DiSEqC") 2.0 protocol to upstream provider-controlled equipment (step 304). This signal is sent out via both of the set-top RF connectors (104 and 106 of FIG. 1). The set-top box then determines if the upstream equipment has returned a response confirming that the installation should proceed as a single-cable second-generation installation in step 306. If this conditional is answered in the affirmative, the single-cable second-generation installation and configuration of the set-top box proceeds (step 308). The requisite information to perform the installation and configuration is stored within the memory of the set-top box and accessed by the controller. Once the installation and configuration are complete, the process terminates (310).

If the set-top box fails to receive a response confirming that a single-cable second-generation installation should proceed (step 306 is answered in the negative), then the process continues with a query as to whether there are additional installation tests to be performed (step 312). As shown in FIG. 2, the automated installation process consists of a series of tests for various types of installations, and the prescribed tests can be performed in any order. If the single-cable second-generation test was not the last of these tests to be performed in the series, then the process proceeds to the next installation test (step 314). If, however, the single-cable second-generation test was indeed the final installation test, the set-top box checks that a valid installation of some type has been achieved (step 316). If this is so, the process terminates (310). Contrastingly, if the set-top box determines that a successful installation has not been achieved, a failure message is generated (step 318). This failure message could be displayed or communicated locally to a consumer or technician, and/or sent upstream to the provider.

Figure 4A:
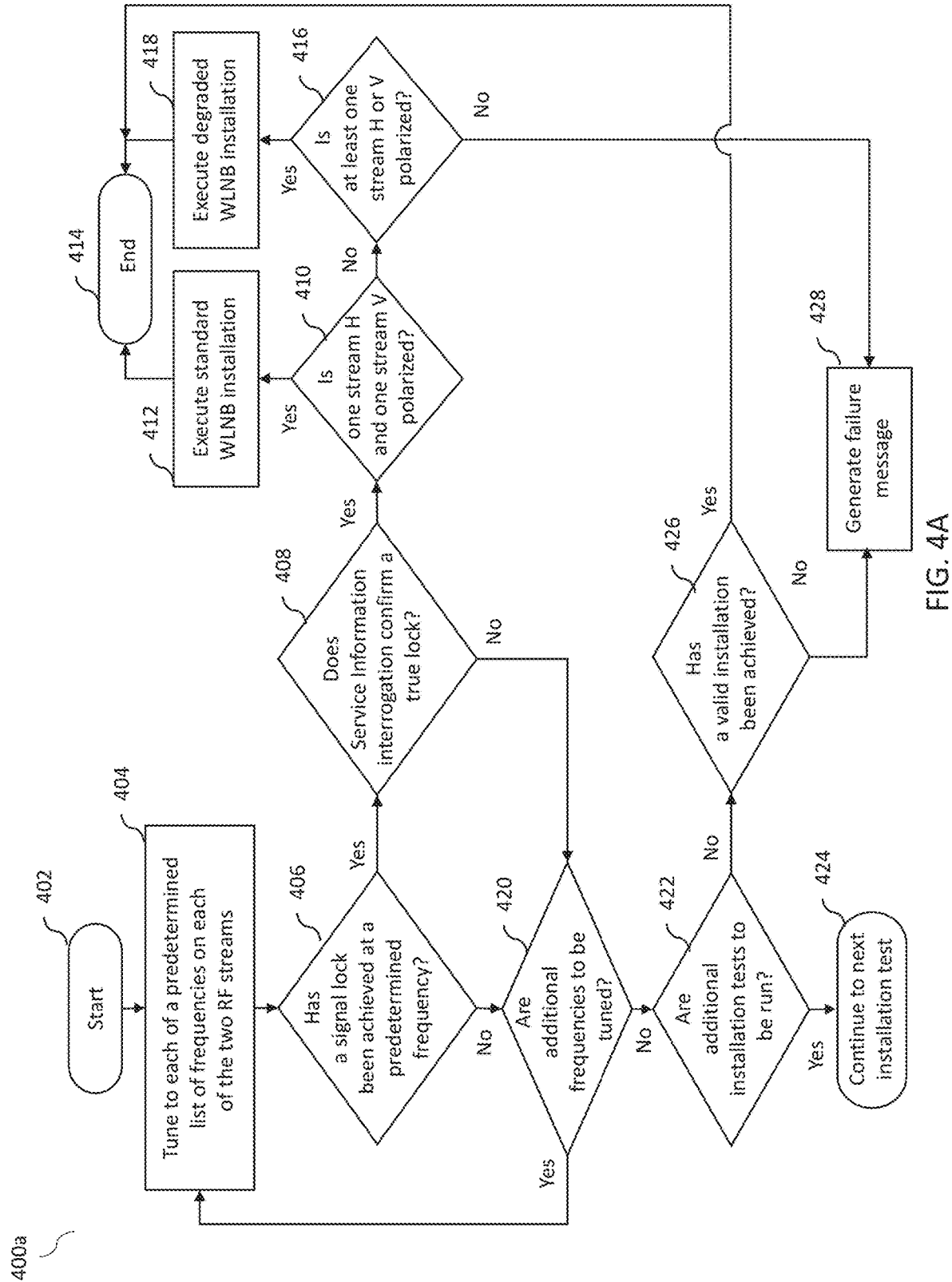
FIG. 4A is a functional block diagram of a first process for automating the installation and configuration of a satellite premises device in response to detecting a ULNB radio-frequency signal.

The steps to detect a ULNB installation utilizing a predetermined list of target frequencies are detailed in the process flow (400a) shown in FIG. 4A. The predetermined frequency list would be specified by the provider and stored within the memory of set-top box 102. The process initiates with step 402 and the set-top box controller then directs the set-top box to tune each of the two set-top RF connectors (104 and 106 of FIG. 1) to the predetermined frequencies stored in memory (step 404). When a signal lock is detected at a tuned frequency (an affirmative outcome from step 406), the set-top box performs a service information ("SI") interrogation to confirm that the lock is on a true signal from the provider (step 408). If a true lock is confirmed, the process continues with step 410 and set-top box then determines if at least one streams received at a connector is H polarized and the stream received on the other connector is V polarized. If this is confirmed, the standard ULNB installation and configuration is executed (step 412) and the process then terminates (414). If the determination at step 410 resulted in a negative outcome, the process would continue with step 416 and the set-top box would determine if at least one received stream exhibited either H or V polarization. If this was found to be the case a degraded ULNB installation would be executed (step 418) and then the process would terminate (414).

If no signal lock was detected at step 406, the set-top box would check if additional listed frequencies were yet to be tuned to in step 420. If so, the process would continue with step 404 and a new listed frequency would be tuned to. If there were no additional frequencies to be tuned in the list, the set-top box would determine if additional installation tests were to be performed (step 422). If so, the process proceeds to the next installation test (step 424). If, however, the frequency list ULNB test was the final installation test, the set-top box checks that a valid installation of some type has been achieved (step 426). If this is so, the process terminates (414). Contrastingly, if the set-top box determines that a successful installation has not been achieved, a failure message is generated (step 428). This failure message could be displayed or communicated locally to a consumer or technician, and/or sent upstream to the provider. Similarly, if SI interrogation (step 408) failed to confirm a true lock, the process would continue with step 420, and follow the process steps described above.

Figure 4B:
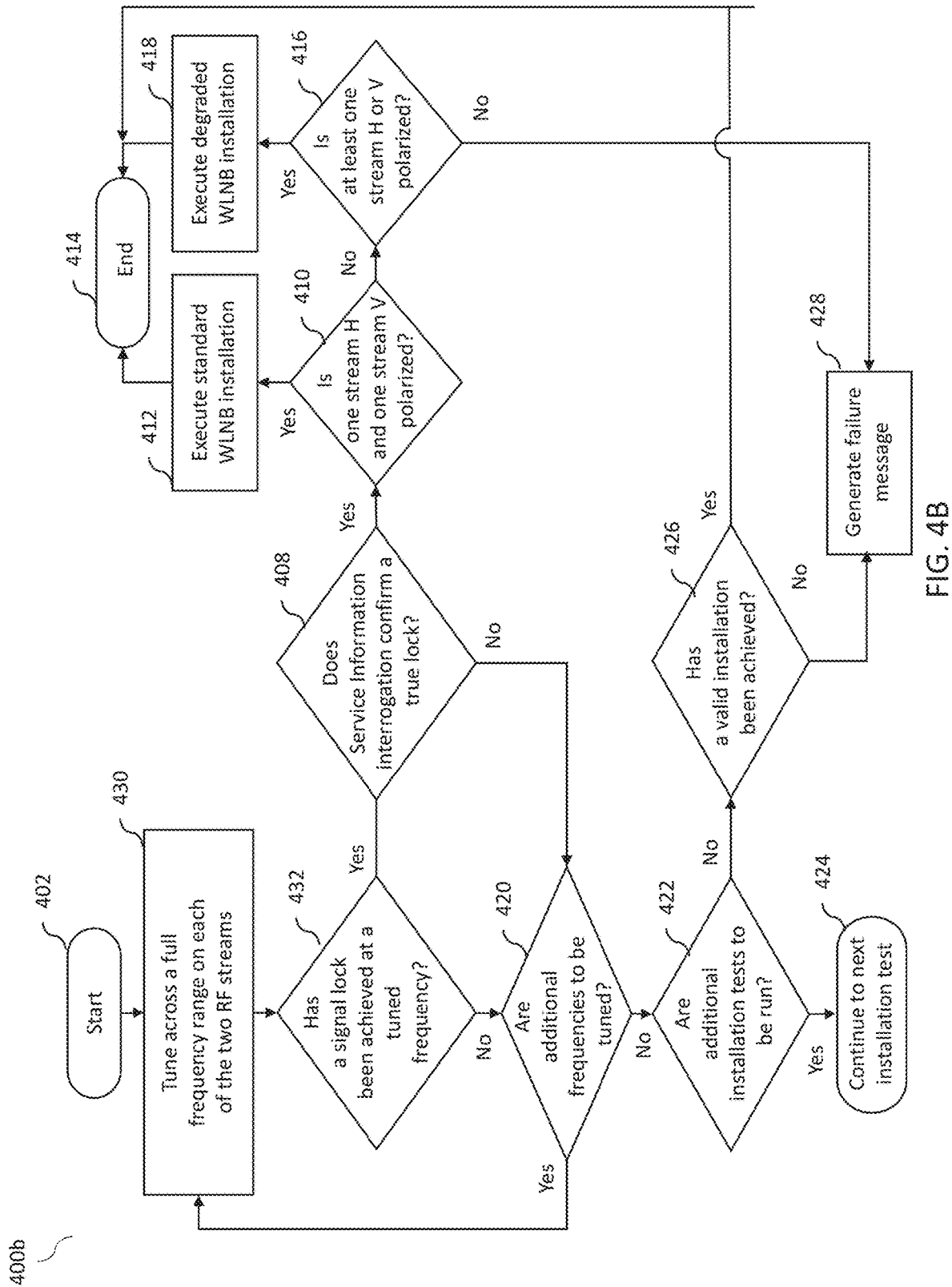
FIG. 4B is a functional block diagram of an alternate process for automating the installation and configuration of a satellite premises device in response to detecting a ULNB radio-frequency signal.

FIG. 4B provides a process flow diagram of the steps employed to detect a ULNB installation utilizing full-frequency tuning over a specified band. The process differs from of FIG. 4A only in steps 430 and 432, which specify tuning across a full frequency range and achieving a lock at a tuned frequency (as opposed to tuning to a listed frequency and achieving a lock on the same). All other processes specified in FIG. 4B are identical to the similarly numbered steps of FIG. 4A.

Figure 5A:
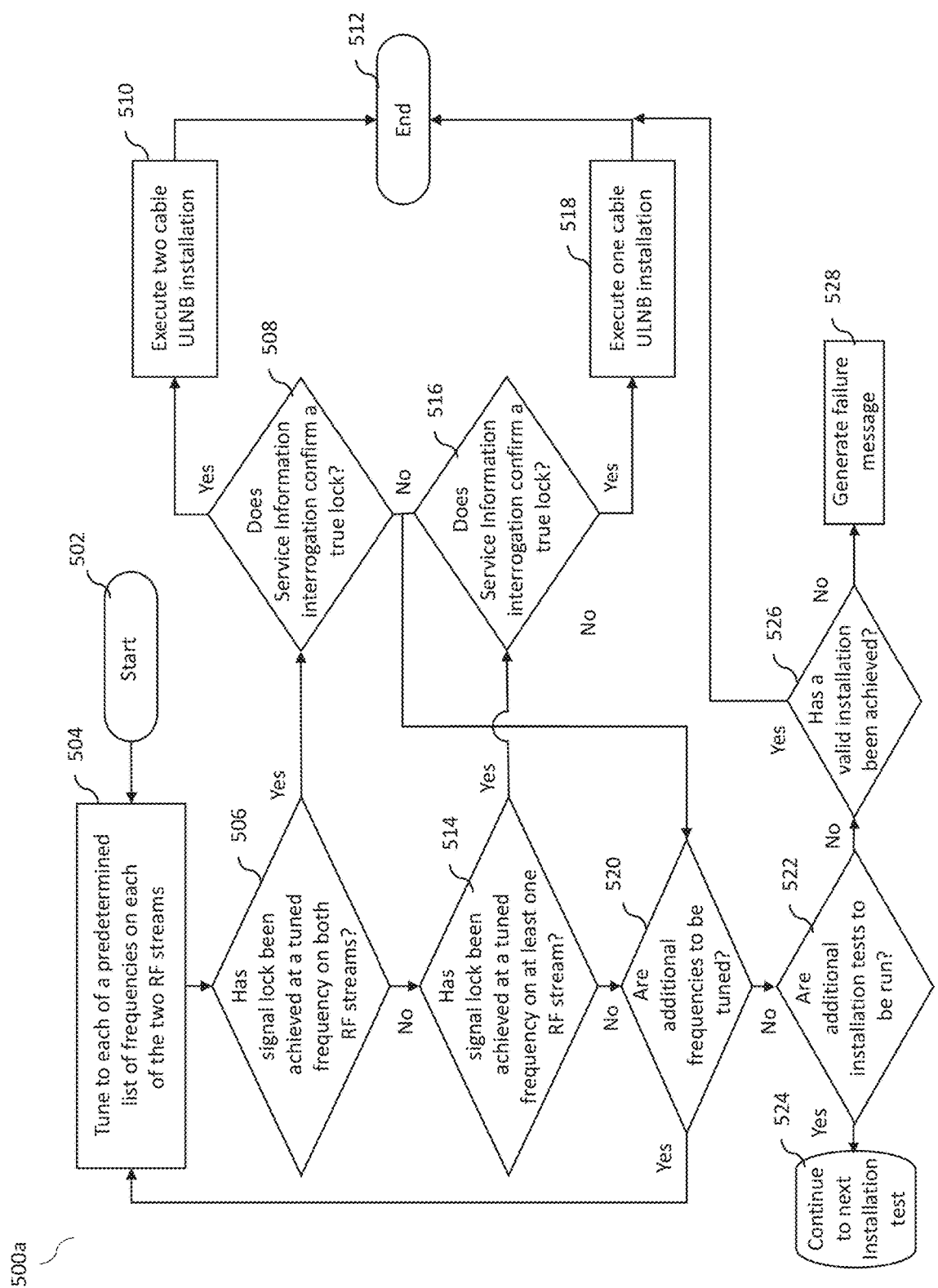
FIG. 5A is a functional block diagram of a first process for automating the installation and configuration of a satellite premises device in response to detecting a ULNB radio-frequency signal.

The process flow for detecting one or two cable ULNB installation utilizing a predetermined list of frequencies is shown in FIG. 5A. The predetermined frequency list would be specified by the provider and stored within the memory of set-top box 102. The process initiates with step 502 and the set-top box controller then directs the set-top box to tune each of the two set-top RF connectors (104 and 106 of FIG. 1) to the predetermined frequencies stored in memory (step 504). When a signal lock is detected at a tuned frequency on both RF connectors (an affirmative outcome from step 506), the set-top box performs a service information ("SI") interrogation to confirm that the lock is on a true signal from the provider (step 508). If a true lock is confirmed, the process continues with step 510 and a two-cable ULNB installation and configuration is executed and then the process then terminates (512). If the determination at step 506 resulted in a negative outcome, the process would continue with step 514 and the set-top box would determine if a lock had been achieved for the stream received on at least one of the RF connectors. If this was found to be the case the set-top box would then perform an SI interrogation to confirm that the lock is on a true signal from the provider (step 516). If this was confirmed, a one-cable ULNB installation would be executed (step 518) and then the process would terminate (512).

If no signal lock was detected at steps 506 and 514, the set-top box would check if additional listed frequencies were yet to be tuned to in step 520. If so, the process would continue with step 504 and a new listed frequency would be tuned to. If there were no additional frequencies to be tuned in the list, the set-top box would determine if additional installation tests were to be performed (step 522). If so, the process proceeds to the next installation test (step 524). If, however, the frequency list ULNB test was the final installation test, the set-top box checks that a valid installation of some type has been achieved (step 526). If this is so, the process terminates (512). Contrastingly, if the set-top box determines that a successful installation has not been achieved, a failure message is generated (step 528). This failure message could be displayed or communicated locally to a consumer or technician, and/or sent upstream to the provider. Similarly, if either SI interrogation (steps 508 and 516) failed to confirm a true lock, the process would continue with step 520, and follow the process steps described above.

Figure 5B:
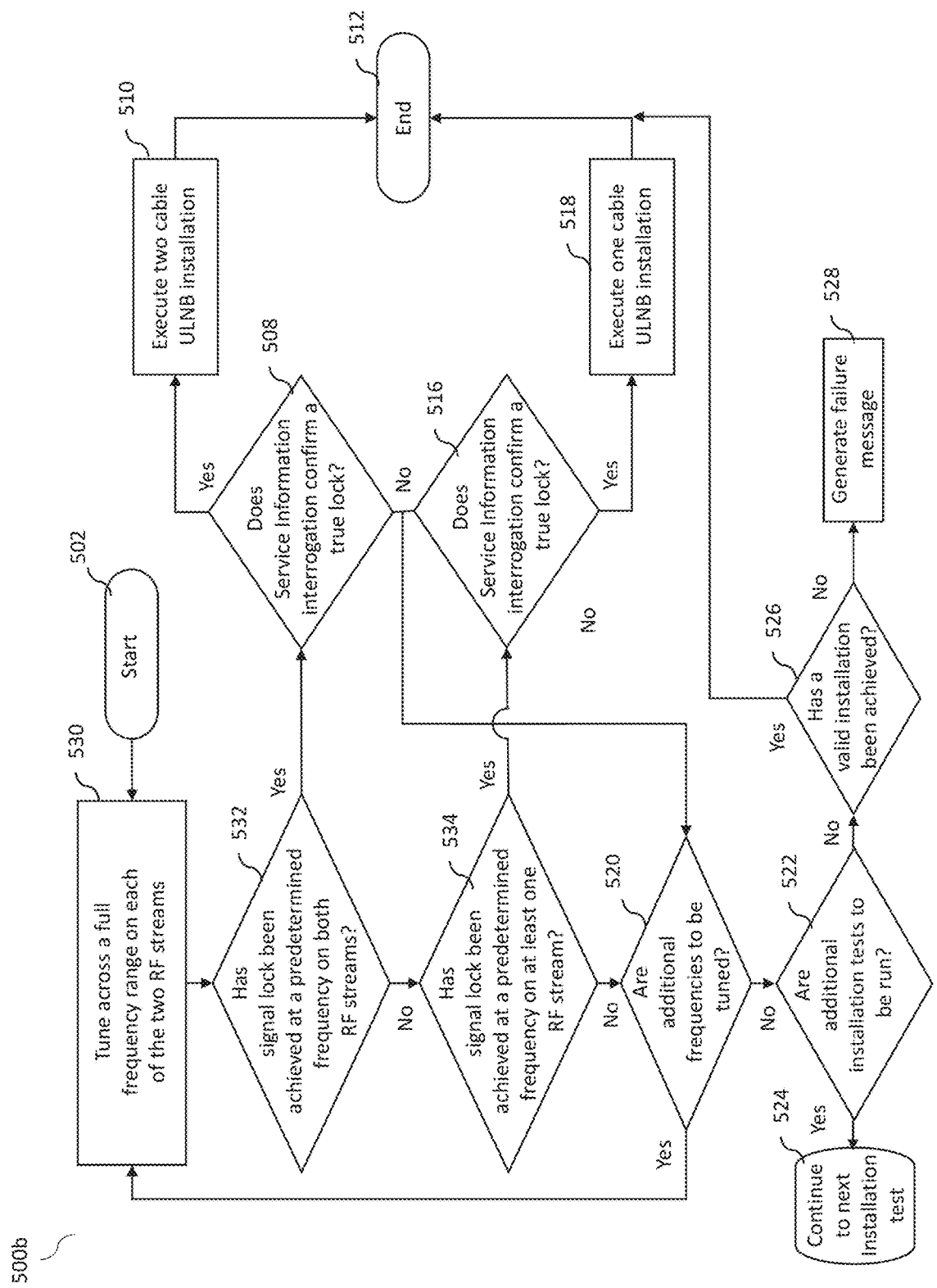
FIG. 5B is a functional block diagram of an alternate process for automating the installation and configuration of a satellite premises device in response to detecting a ULNB radio-frequency signal.

FIG. 5B provides a process flow diagram of the steps employed to detect a ULNB installation utilizing full-frequency tuning over a specified band. The process differs from that of FIG. 5A only in steps 530, 532 and 534, which specify tuning across a full frequency range and achieving a lock at a tuned frequency (as opposed to tuning to a listed frequency and achieving a lock on the same). All other processes specified in FIG. 5B are identical to the similarly numbered steps of FIG. 5A.

Although the invention herein has been described with reference to particular embodiments, it is to be understood that these embodiments are merely illustrative of the principles and applications of the present invention. Other embodiments and variations could be implemented without departing from the spirit and scope of the present invention as defined by the appended claims. For example, the set-top box could tune each connector either serially or in parallel. The connectors could be any type of terminal adapted for the transmission and reception of RF signals or streams, and the RF streams and signals could be of any frequency or band. Furthermore, the invention could be implemented in a single unitary device, or across multiple networked devices.

The invention claimed is:

1. A system for automating the installation of a broadband satellite system premises device, comprising:
   at least two terminals each adapted to receive an individual radio-frequency stream; and
   a controller comprised of at one processor and at least one memory and adapted to:
      tune to at least one radio-frequency stream evident on the at least one of the at least two terminals;
      achieve a signal lock on the at least one tuned radio-frequency stream;
      recognize a specific installation configuration based on the at least one tuned and locked radio-frequency stream; and
      configure the broadband satellite system premises device for a specific installation based on at least the recognition of a specific installation configuration.

2. The system of claim 1 wherein service information is interrogated to determine if a stream lock has been achieved.

3. The system of claim 1 wherein the configuration of the broadband satellite system premises device is further based upon information stored in the memory.

4. The system of claim 1 wherein the tuning further comprises serially searching for one of a predetermined plurality of radio-frequency signal types.

5. The system of claim 1 wherein the controller is further adapted to recognize radio-frequency streams comprising at least one of the following signal types:
   a universal low-noise block satellite system stream;
   a single-cable second-generation satellite system stream; and
   a wideband low-noise block satellite system stream.

6. The system of claim 1 wherein the at least radio-frequency stream comprises a wideband low-noise block satellite signal.

7. The system of claim 1 wherein the controller is further adapted to tune based on a predetermined list of frequencies stored in the memory.

8. The system of claim 1 wherein the controller is further adapted to tune across a frequency band.

9. The system of claim 1 wherein the controller is further adapted to generate a message if it fails to configure the broadband satellite system.

10. The system of claim 1 wherein the controller is further adapted to tune onto two radio-frequency streams, each evident upon one of the at least two terminals.

11. The system of claim 10 wherein the two radio-frequency streams comprise at least one of the following signal types:
    a universal low-noise block satellite system stream; and
    a wideband low-noise block satellite system stream.

12. The system of claim 10 wherein the controller is further adapted to determine the polarization of at least one of the two radio-frequency streams.

13. A method for automating the installation of a broadband satellite system premises device, comprising the steps of:
    monitoring at least two terminals for a radio-frequency stream;
    tuning to at least one radio-frequency stream evident on the at least one of the at least two terminals;
    achieving a signal lock on the at least tuned one radio-frequency stream;
    recognizing a specific installation configuration based on the at least one tuned and locked radio-frequency stream; and
    configuring a broadband satellite system premises appliance for a specific installation based on information the recognition of a specific installation configuration.

14. The method of claim 13 further comprising the step of interrogating service information to determine if a stream lock has been achieved.

15. The method of claim 13 wherein the step of configuring the broadband satellite system premises device is further based upon information stored in a memory associated with broadband satellite system premises device.

16. The method of claim 13 wherein the step of tuning further comprises serially searching for one of a predetermined plurality of radio-frequency signal types.

17. The method of claim 13 further comprising the step of recognizing radio-frequency streams comprising at least one of the following signal types:
    a universal low-noise block satellite system stream;
    a single-cable second-generation satellite system stream; and
    a wideband low-noise block satellite system stream.

18. The method of claim 13 wherein the at least radio-frequency stream comprises a wideband low-noise block satellite signal.

19. The method of claim 13 wherein the step of tuning is performed based on a predetermined list of frequencies stored in a memory associated with broadband satellite system premises device.

20. The method of claim 13 wherein the step of tuning comprises tuning across a frequency band.

21. The method of claim 13 further comprising the generation of a message if the step of configuring fails.

22. The method of claim 13 wherein the step of tuning comprises tuning onto two radio-frequency streams, each evident upon one of the at least two terminals.

23. The method of claim 22 wherein the two radio-frequency streams comprise at least one of the following signal types:
   a universal low-noise block satellite system stream; and
   a wideband low-noise block satellite system stream.

24. The method of claim 22 further comprising the step of determining the polarization of at least one of the two radio-frequency streams.

\* \* \* \* \*